A. V. FOLSOM.
SOLAR STEAM GENERATOR.
APPLICATION FILED FEB. 14, 1919.
1,345,758.
Patented July 6, 1920.
2 SHEETS—SHEET 2.
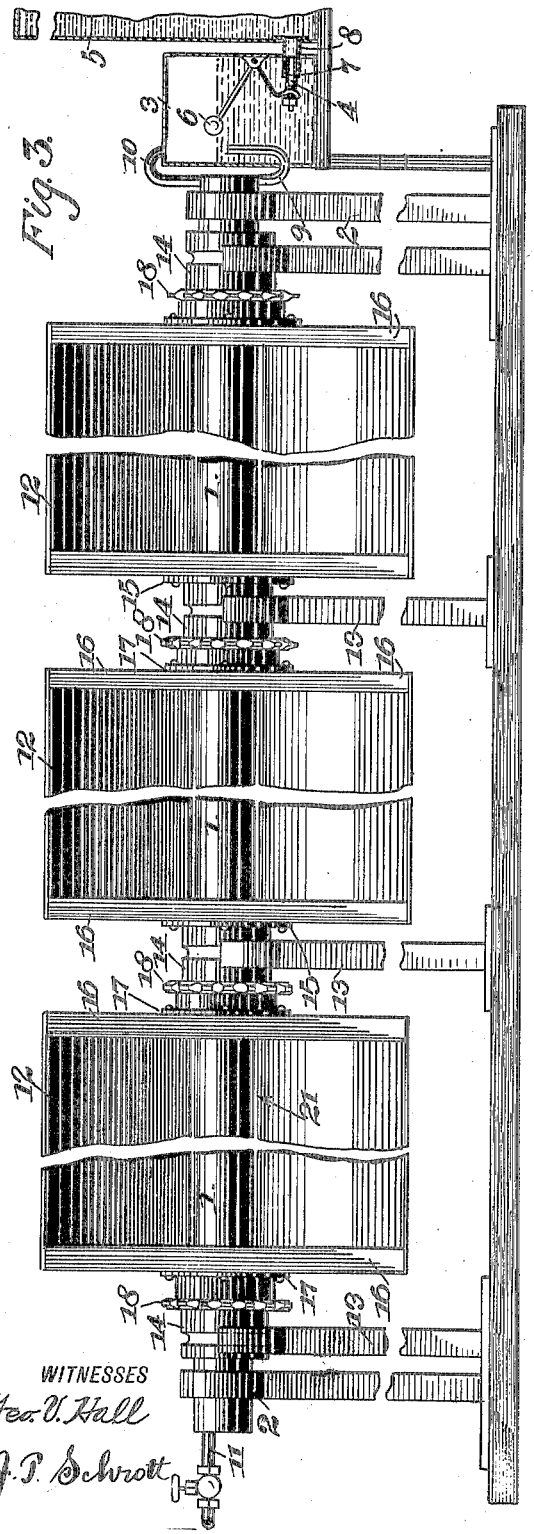
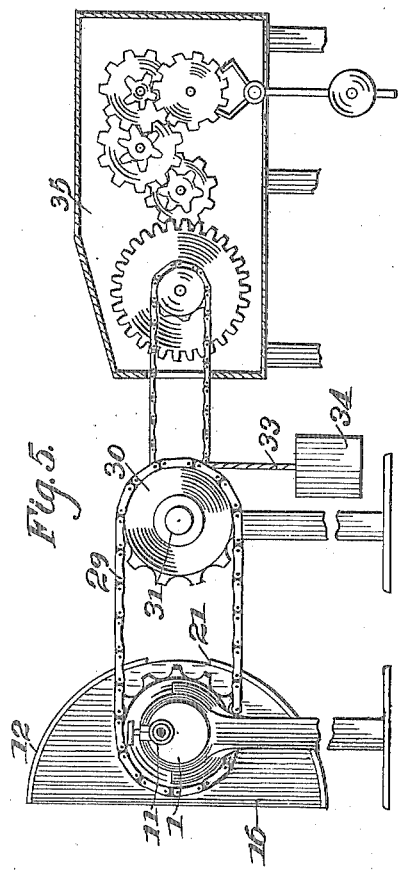
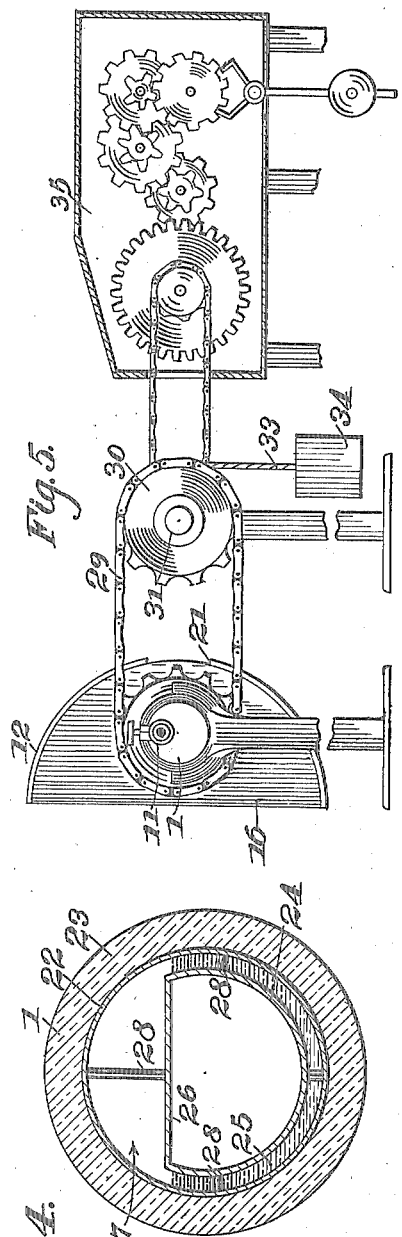
WITNESSES
Geo. V. Hall
J. P. Schrott
INVENTOR
Arthur V. Folsom
BY
Munn & Co.
ATTORNEYS

UNITED STATES PATENT OFFICE.

ARTHUR V. FOLSOM, OF JACKSONVILLE, FLOR

SOLAR STEAM-GENERATOR.

1,345,758.  Specification of Letters Patent.  Patented July 6, 1920.

Application filed February 14, 1919. Serial No. 277,088.

*To all whom it may concern:*

Be it known that I, ARTHUR V. FOLSOM, a citizen of the United States, and a resident of Jacksonville, in the county of Duval and State of Florida, have invented certain new and useful Improvements in Solar Steam-Generators, of which the following is a specification.

My invention relates to improvements in solar steam generators, and it consists in the constructions, combinations and arrangements herein described and claimed.

An object of my invention is to provide a solar steam generator the principal features of which consists of suitable means for containing water, disposed in such a way as to be heated by means of the rays from the sun through the instrumentality of a reflector for concentrating the rays thereon, other means being provided to turn or move the reflector in such a way as to always keep it facing the sun.

A further object of the invention resides in the provision of means in a solar steam generator, for supporting a tubular boiler in the focal center of a reflector that is arranged to revolve around the boiler, one being out of contact with the other so as to prevent direct conduction of the heat from the boiler.

A further object of the invention is to provide means whereby the supply of water to the tubular boiler is normally kept at a predetermined level.

A still further object of the invention is to provide a tubular boiler for a solar steam generator, which is arranged in such a way that the water is spread out in a relatively thin film so as to render the action of the heat thereon more effective in rapidly generating low pressure steam.

Figure 1:
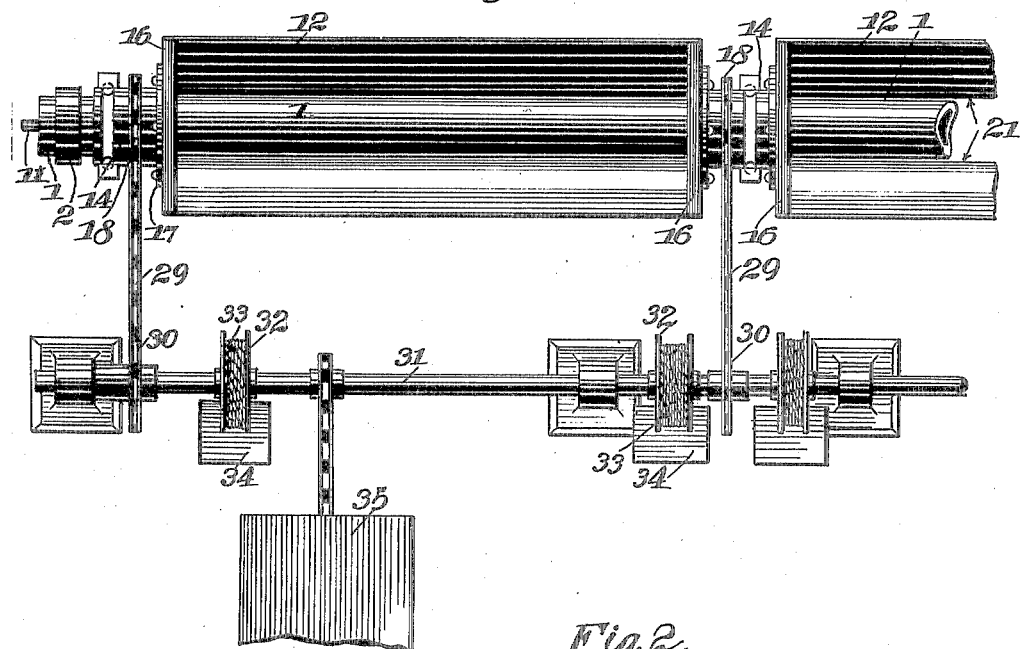
Figure 2:
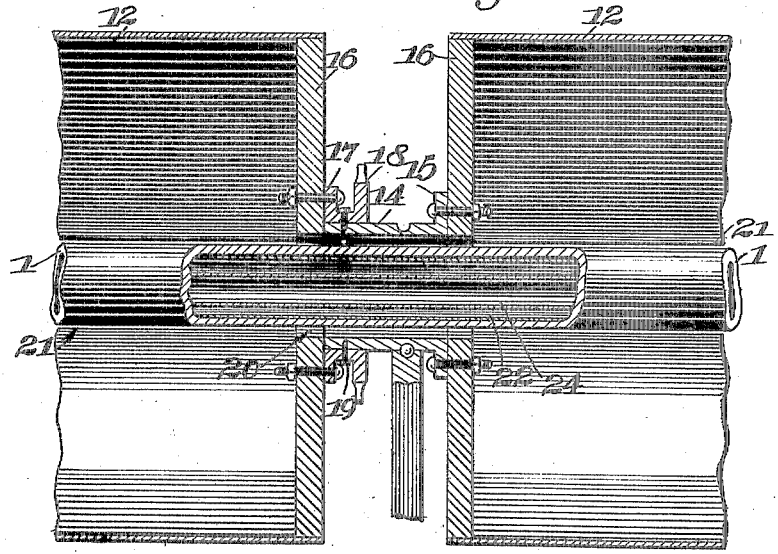

Other objects and advantages will appear in the following specification, reference being had to the accompanying drawing in which:

Figure 1 is a plan view of a portion of a battery of generators, the reflectors being turned to the zenith, Fig. 2 is a detail section showing how the reflectors are supported independently and out of contact with the tubular boiler, Fig. 3 is a front elevation of a battery of generators, parts being shown in section and other parts being broken away, Fig. 4 is a detail cross section of the improved tubular boiler, and Fig. 5 is an end view showing how the reflectors are slowly revolved to keep them facing the sun.

In carrying out my invention I provide a tubular boiler 1 which is supported near its extremities in a suitable support 2. Water is kept at a predetermined level in the boiler 1 by means of an automatic supply tank 3 in which the float-operated valve 4 controls the admission of water from the supply tank 5. The float 6 follows the level of the water in the tank 3, and when the water recedes to a predetermined level, the normally disalined openings 7 in the valve 4 and the tube 8 are moved into registration and more water flows in.

A pipe 9 leads the water from the supply tank 3 to the tubular boiler 1. A gooseneck 10 provides communication between the upper portion of the boiler and the space above the water in the supply tank. The pressure in the boiler and the supply tank are thus equalized. A valved feed discharge pipe 11 at the other end of the tubular boiler leads to any desired place where the low pressure steam generated by the steam generator is to be used.

One or more reflectors 12 are disposed partly around the tubular boiler and are made to rotate with respect to the boiler so as to continuously focus the rays of the sun on the boiler when the sun shines. It is to be observed that the cross sectional shape of each reflector may be such as actual practice may demonstrate to be best. For example, the reflector may be semi-circular as shown, or it may be parabolic, or any other desired shape. The tubular boiler is located as nearly as possible in the focal center of the reflector, and as stated above, the reflectors are supported independently of the tubular boiler so that there are no contacting parts between the two, that might result in an objectionable conducting away of heat.

Bearings 13 of any suitable design, support the hubs 14 of the reflectors. Each of the hubs is constructed substantially as shown in Fig. 2. Here the hub 14 has a flange 15 at one side, which is secured to the adjacent head 16 of the reflector at the right. A flange 17 that is made a part of the sprocket 18, is secured to the adjacent head 16 of the other reflector at the left.

It will be observed that in order to enable the assembling of these parts of the structure, the integral flange 17 and sprocket 18 is slipped on the hub and secured by any suitable means 19. The foregoing description of the hub structure illustrates only one of many ways of supporting the reflectors, and in practice may readily be substituted by some equivalent structure.

The bore 20 which extends completely through the hub structure, is sufficiently larger than the tubular boiler 1 so as to leave a decided space around the boiler and avoid any contact between the two. Longitudinal openings 21 in the reflectors are for the purpose of reducing the air pressure on the reflector when it faces the wind. The openings 21 in each case are approximately equal in width to the diameter of the tubular boiler.

Attention is directed to the novel construction of the tubular boiler 1 in Fig. 4. A tube 22 of metal, or any other suitable material, is surrounded by a glass sleeve 23. The material of which the sleeve 23 is made is not confined exclusively to glass but may be any other suitable heat retaining substance. An inner filler tube 24 is disposed concentrically with respect to the outer tube 22 and provides a relatively narrow space 25 in which the water spreads out in a relatively thin film or layer.

The upper part of the filler tube 24 is flat at 26. The space 27 thus provided constitutes the reservoir in which the low pressure steam collects. The tubes 22 and 24 are held spaced apart by stays or braces 28 of any suitable design.

Consider now the manner of turning the reflectors. A chain 29 is applied to each of the sprockets 18 of the hubs 14, and to a similar sprocket 30 on a countershaft 31 in back of the reflectors. A suitable number of sheaves 32 are carried by the countershaft 31, and upon each of these is wound a cable 33 with a weight 34 attached to the free end. A governor 35 of any suitable type is employed to regulate the speed of revolution of the countershaft 31. The weights 34 are the immediate means by which the countershaft 31 is turned, and the various intermeshing gears illustrated in Fig. 5, serve to regulate the movement of the countershaft. The various gears are of the required ratios, and collectively act as a governor for the speed of the countershaft 31.

In practice, the reflectors are preferably placed lengthwise, extending from north to south, so as to permit of an east to west sweep thereof. Although the open trough reflectors may be of any desired shape, they are preferably made half cylindrical as shown. The steam reservoir or chamber 27 is equal in height to approximately one-third of the diameter of the outside tube 22, and to have the space 25 filled with liquid to approximately two-thirds of the height of the diameter of the outside tube, is thought to be substantially correct.

While the construction and arrangement of the solar steam generator as herein described and claimed, is that of a generally preferred form, obviously modifications and changes may be made without departing from the spirit of the invention or the scope of the claims.

I claim:

1. A solar heater, comprising a reflector having heads and hubs, each provided with a bore in alinement, means for rotatably supporting the reflector at the hubs, a tubular boiler disposed longitudinally of the reflector and extending through the aforesaid bores in circumferentially spaced relation, means for fixedly supporting the tubular boiler, means having driving engagement with said hubs for turning the reflector, and means for regulating the rate of movement of said driving means.

2. A solar steam generator, comprising a reflector with heads and hubs attached thereto, each having a bore in axial alinement with the other, bearing means supporting the reflector at the hubs, a tubular boiler extending longitudinally of the reflector and beyond said hubs, said boiler being smaller in diameter than said bores to leave an annular space around the boiler inside of the hubs and thus avoid contact, and suitable means for fixedly supporting said boiler.

3. A solar steam generator, comprising a tubular boiler fixedly supported, means located inside of the boiler for spreading the water out in a relatively thin layer against a portion of the inner surface of the boiler, said means being arranged to provide a steam chamber at the top, water supply means for the boiler, means embodied therein for automatically keeping the level of the water in the boiler at a predetermined height, means for equalizing the pressures of the water in the boiler and said supply means, a battery of reflectors rotatably mounted with respect to the boiler, and including connecting hubs with bores larger than the tubular boiler to leave an annular space, means for rotatably supporting the battery of reflectors at the hubs, means in driving connection with said hubs for rotating the reflectors to keep them facing the sun, and means in operative connection with said driving means for regulating the movement thereof.

4. In a solar steam generator, a boiler including a water tube, a glass sleeve incasing the tube, a filler tube inside of the boiler tube, smaller in diameter than the boiler tube to form a space to be occupied by the water in a relatively thin layer, said filler tube including a flat upper portion to provide a steam chamber at the top of the boiler tube, and means extending between the two tubes to hold the filler tube in spaced relationship.

5. A solar heater, comprising a boiler, and a reflector in the focus of which the boiler is situated, the reflector being complete to center all light rays on the boiler, with the exception of a back opening of substantially the size of the boiler shadow, to let air pass through when facing the wind.

6. A solar heater, comprising a battery of rotatable reflectors, each reflector with end heads and connecting tubular hubs suitably journaled, and a boiler co-extensive with said battery of reflectors, extending therethrough but spaced from the walls of said hubs, and means providing fixed supports for the boiler at its ends.

7. A solar generator, comprising a battery of reflectors, each reflector with end heads adjacently spaced, and connecting tubular hubs with means in which they are journaled; a boiler co-extensive with said reflector battery extending through but spaced from the hub walls to avoid contact, with supporting means at the ends; and mechanism operatively associated with said hubs for rotating the reflectors and governing the speed of rotation.

ARTHUR V. FOLSOM.

Witnesses:
G. E. GAGE,
A. C. CONYERS.